UNITED STATES PATENT OFFICE 2,331,638

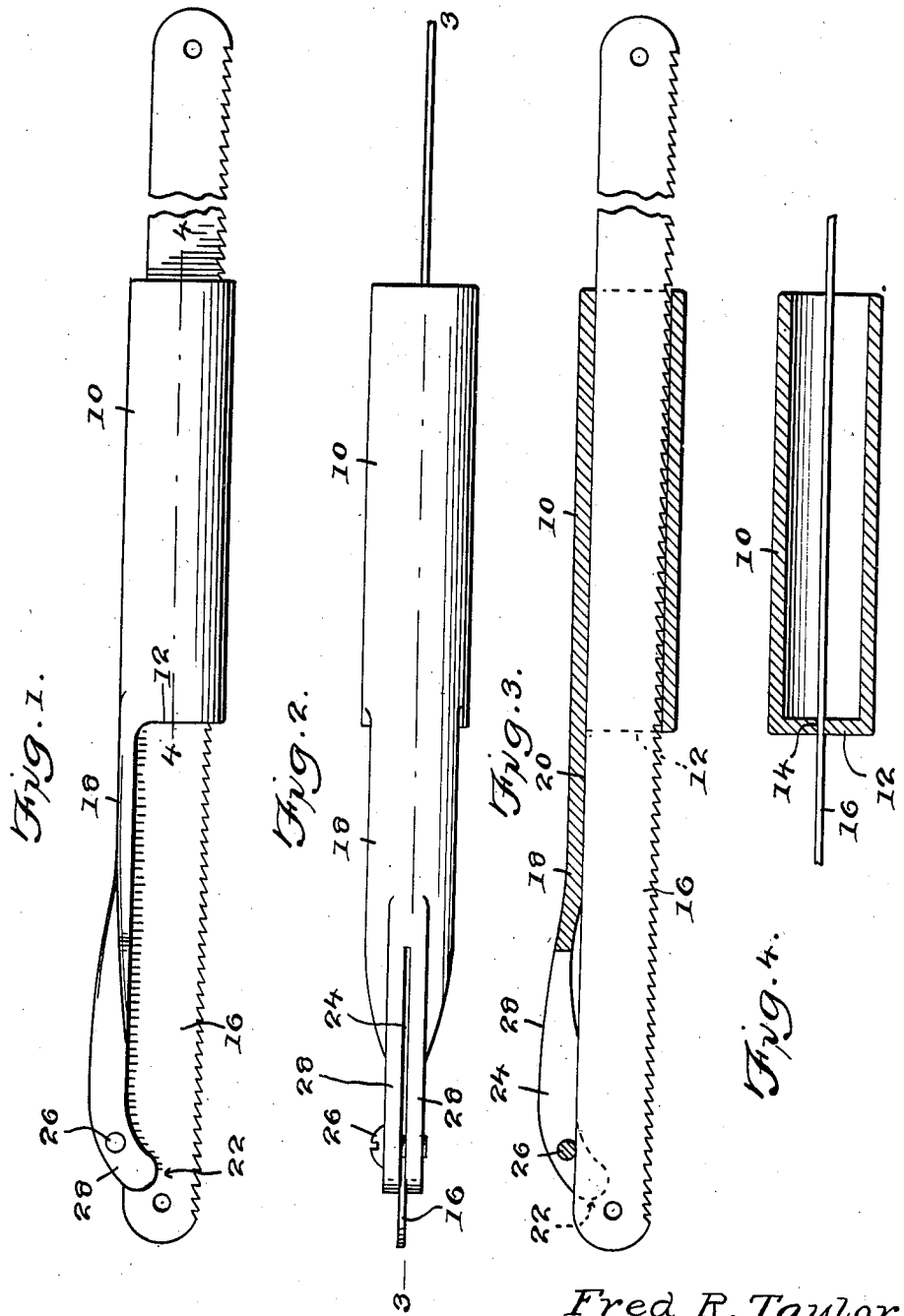

TOOLHOLDER

Fred R. Taylor, Roseville, Ill.

Application September 23, 1942, Serial No. 459,408

1 Claim. (Cl. 145—31)

My invention relates to mechanics' tools, and has among its objects and advantages the provision of an improved hack saw blade holder particularly suitable for recutting grooves in motor and generator armatures, although the tool is well suited to other lines of work.

In the accompanying drawing:

Figure 1 is a side view of the tool;

Figure 2 is a top view;

Figure 3 is a sectional view along the line 3—3 of Figure 2; and

Figure 4 is a sectional view along the line 4—4 of Figure 1.

In the embodiment selected for illustration, I make use of a handle 10 which may comprise a metal tube having a front end wall 12 provided with a slot 14 through which a hack saw blade 16 may be inserted. The top of the handle 10 is extended to provide a bar 18 for engagement with the back edge 20 of the blade 16. This extension has a downwardly extending forward end 22. This extension is slotted at 24 so that the blade is receivable therein throughout a short length at the end 22.

A screw 26 contacting with the back edge of the blade 16 near the front end of the latter, passes loosely through an opening in the jaw or finger 28 and is threaded through the other jaw or finger 28 so that the blade may be clamped firmly between the jaws or fingers through tightening of the screw. When so tightened, the blade 16 is held firmly against relative shifting when being used for cutting purposes. The wall 12 restrains the blade from rotation about its longitudinal axis and the extension 18 is located rearwardly of the blade so as to make the full width of the blade available for deep cuts. In locating the wall 12 at the forward end of the handle, effective support is provided for the blade adjacent its cutting zone. In addition, the location of the end wall permits blades of different lengths to be employed.

Without further elaboration, the foregoing will so fully illustrate my invention, that others may, by applying current knowledge, readily adapt the same for use under various conditions of service.

I claim:

A blade holder comprising a tubular handle having an inner diameter slightly greater than the width of the blade to arrange the edges of the blade in contact with the wall of the handle, said handle having a front end wall forming an integral part thereof and fully open at its rear end, said end wall being provided with a slot adapted to snugly receive the blade, a bar forming an integral portion of the handle and extending forwardly from the top of the handle for contact with the back edge of the blade, the front portion of the bar being split longitudinally and the front end thereof extending downwardly to provide jaws contacting with the sides of the blade, and a screw carried by the jaws and contacting with the back edge of the blade to clamp the jaws against the blade.

FRED R. TAYLOR.